(12) United States Patent
Chen et al.

(10) Patent No.: US 11,054,617 B2
(45) Date of Patent: Jul. 6, 2021

(54) IMAGING OPTICAL LENS HAVING LENSES OF +---+- REFRACTIVE POWERS

(71) Applicant: AAC Acoustic Technologies (Shenzhen) Co., Ltd., Shenzhen (CN)

(72) Inventors: Chenxiyang Chen, Shenzhen (CN); Hiroyuki Teraoka, Shenzhen (CN); Chunhuan Fang, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 198 days.

(21) Appl. No.: 16/524,076

(22) Filed: Jul. 28, 2019

(65) Prior Publication Data
US 2020/0041766 A1    Feb. 6, 2020

(30) Foreign Application Priority Data
Aug. 2, 2018 (CN) .......................... 201810871590.3

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

2018/0172955 A1* 6/2018 Bone ..................... G02B 3/04

* cited by examiner

*Primary Examiner* — Wen Huang
(74) *Attorney, Agent, or Firm* — W&G Law Group LLP

(57) ABSTRACT

The present disclosure relates to optical lenses and discloses an imaging optical lens. The imaging optical lens includes from an object side to an image side in sequence: an aperture, a first lens having a positive refractive power, a second lens having a negative refractive power, a third lens having a negative refractive power, a fourth lens having a negative refractive power, a fifth lens having a positive refractive power, and a sixth lens having a negative refractive power. A focal length of the imaging optical lens is f, a focal length of the third lens is f3, an Abbe number of the first lens is v1, an Abbe number of the second lens is v2, and the following relational expressions are satisfied: $-500 \leq f3/f \leq -50$; and $2.7 \leq v1/v2 \leq 5.0$.

5 Claims, 6 Drawing Sheets

IMAGING OPTICAL LENS HAVING LENSES OF +−−−+− REFRACTIVE POWERS

TECHNICAL FIELD

The present disclosure relates to optical lenses, and in particular, to an imaging optical lens applied to portable terminal devices such as smart phones and digital cameras and imaging devices such as monitors and PC lenses.

BACKGROUND

In recent years, with a continuous improvement of processes for manufacturing photosensitive elements such as charge coupled devices (CCD) and complementary metal-oxide semiconductors (CMOS), a pixel size of photosensitive elements is decreasing gradually, and performance of photosensitive elements is continuously improved. Therefore, there is a need for an optical imaging system with excellent optical performance and high light flux.

At present, a technical solution of a six-piece lens with a large aperture and high light flux is being promoted. For example, an imaging optical lens includes from an object side to an image side in sequence: a first lens having a positive refractive power, a second lens having a negative refractive power, a third lens having a negative refractive power, a fourth lens having a negative refractive power, a fifth lens having a positive refractive power, and a sixth lens having a negative refractive power. However, a material of lenses of the imaging optical lens is not properly distributed, and a ratio of the refractive power of the lenses of the imaging optical lens is not properly set. Thus, the light flux is insufficient, and a wide angle effect cannot be achieved.

The imaging optical lens in existing technologies cannot provide excellent image quality while achieving a large aperture, high light flux, and a wide angle. Therefore, it is necessary to provide a new technical solution to overcome the foregoing limitations.

DETAILED DESCRIPTION

To make objectives, technical solutions, and advantages of the present disclosure clearer, the following further describes embodiments of the present disclosure in detail with reference to accompanying drawings. However, those of ordinary skill in the art may understand that in the embodiments of the present disclosure, many technique details are described to make readers better understand the present disclosure. However, the technical solutions as claimed in the present disclosure may be also realized even without these technique details or various variations and modifications based on the following embodiments.

Embodiment 1

Figure 1:
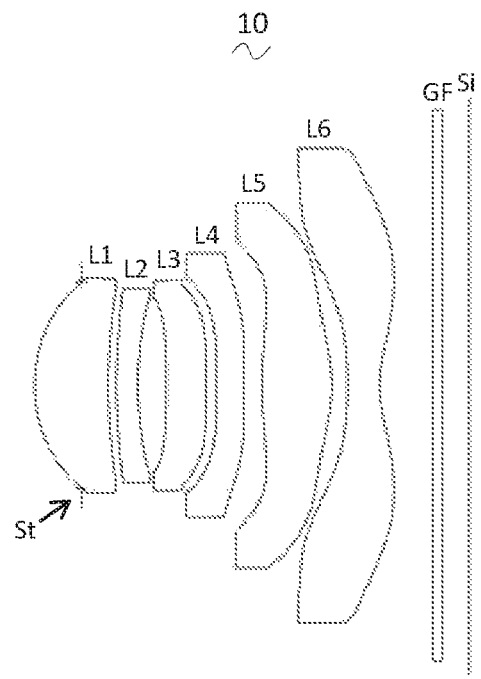
FIG. 1 is a schematic structural diagram of an imaging optical lens according to a first embodiment of the present disclosure.

Referring to the accompanying drawings, the present disclosure provides an imaging optical lens 10. FIG. 1 shows an imaging optical lens 10 according to the first embodiment of the present disclosure. The imaging optical lens 10 includes six lenses. Specifically, the imaging optical lens 10 includes from an object side to an image side in sequence: an aperture St, a first lens L1, a second lens L2, a third lens L3, a fourth lens L4, a fifth lens L5, and a sixth lens L6. In this embodiment, optical elements such as a glass plate GF may be disposed between the sixth lens L6 and an image surface Si. The glass plate GF may be a glass cover plate, or a filter having functions such as IR cut-off filtering. Of course, in other embodiments, the glass plate GF may also be disposed at other positions.

In this embodiment, the first lens has a positive refractive power, and has an object-side surface which is a convex surface projecting outwardly, and an image-side surface which is a concave surface. The second lens L2 has a negative refractive power, and has an object-side surface which is a convex surface, and an image-side surface which is a concave surface. The third lens L3 has a negative refractive power, and has an object-side surface which is a concave surface, and an image-side surface which is a convex surface. The fourth lens L4 has a negative refractive power, and has an object-side surface which is a convex surface, and an image-side surface which is a concave surface. The fifth lens L5 has a positive refractive power. In this embodiment, both an object-side surface and an image-side surface of the fifth lens L5 are convex surfaces. The sixth lens L6 has a negative refractive power. In this embodiment, both an object-side surface and an image-side surface of the sixth lens L6 are concave surfaces.

To better correct aberrations, preferably, surfaces of the six lenses are designed in aspheric shapes.

It is defined herein that a focal length of the imaging optical lens is f, a focal length of the third lens is f3, an Abbe number of the first lens is v1, and an Abbe number of the second lens is v2. f, f3, v1 and v2 satisfy the following relational expressions:

$$-500 \leq f3/f \leq -50 \quad (1)$$

$$2.7 \leq v1/v2 \leq 5.0 \quad (2)$$

A range of a ratio between the focal length of the third lens L3 and the focal length of the entire imaging optical lens 10 is specified by the relational expression (1) in this embodiment. It should be noted that as lenses are developing toward ultra-thinness, optical parameters within the range of the relational expression (1) can help correct aberrations of the imaging optical lens 10.

A range of a ratio between the Abbe number of the first lens L1 and that of the second lens L2 is specified in the relational expression (2) in this embodiment. In this way, chromatic aberrations of an optical system represented by the imaging optical lens 10 can be more effectively corrected.

With lens configuration above, this embodiment adopts the lenses (L1, L2, L3, L4, L5, and L6) which have different refractive power, and the first lens L1 and the second lens L2 of which the Abbe numbers have a specific relationship. Thus, the focal power of the lenses of the imaging optical lens 10 is properly set, and the Abbe number of the first lens L1 and the second lens L2 is reasonably distributed, so that the imaging optical lens 10 provides excellent image quality while achieving a large aperture, high light flux, and a wide angle.

Specifically, in this embodiment of the present disclosure, the first lens L1 has a positive refractive power, a thickness on-axis of the first lens L1 is d1, a focal length of the entire imaging optical lens is f, and d1 and f may be designed to satisfy the following relational expression:

$$0.20 \leq d1/f \leq 0.50 \quad (3)$$

A ratio between the thickness on-axis d1 of the first lens L1 and a focal length f of the entire imaging optical lens is specified in relational expression (3) in this embodiment. Such a design facilitates a development of the imaging optical lens 10 toward a wide angle.

Further, in this embodiment of the present disclosure, the third lens L3 has a negative refractive power, a thickness on-axis of the third lens L3 is d5, a focal length of the entire imaging optical lens 10 is f, and d5 and f may be designed to satisfy the following relational expression:

$$0.11 \leq d5/f \leq 0.2 \quad (4)$$

A ratio between the thickness on-axis d5 of the third lens L3 and the focal length f of the entire imaging optical lens is specified in relational expression (4) in this embodiment. Such a configuration facilitates the development of the imaging optical lens 10 toward a wide angle.

In addition, in this embodiment, a curvature radius of the object-side surface of the first lens L1 is R1, and a curvature radius of the image-side surface of the first lens L1 is R2, and R1 and R2 may be designed to satisfy the following relational expression:

$$-1.90 \leq (R1+R2)/(R1-R2) \leq -1.7 \quad (5)$$

A shape of the first lens L1 is specified in the relational expression (5) in this embodiment. As lenses are developing toward a wide angle and a large aperture, R1 and R5 within a range of the relational expression (5) can help correct higher-order aberrations such as spherical aberrations of the imaging optical lens 10.

It should be noted that as the first lens L1, the second lens L2, the third lens L3, the fourth lens L4, the fifth lens L5, and the sixth lens L6 that constitute the imaging optical lens 10 in this embodiment have a structure and a parameter relationship above, the imaging optical lens 10 can reasonably distribute the focal power, a surface shape, a material, the thickness on-axis, and the like of each lens, and thus correct aberrations. Therefore, for the optical imaging system represented by the imaging optical lens 10 of the present disclosure, Fno≤1.75, thereby providing excellent image quality while achieving a large aperture, high light flux, and a wide angle.

FIG. 1 is a schematic structural diagram of the imaging optical lens 10 in the first embodiment. Design data of the imaging optical lens 10 in the first embodiment of the present disclosure is shown below.

Table 1 illustrates the curvature radii r of the object-side surface and the image-side surface of the first lens L1 to the sixth lens L6 that constitute the imaging optical lens 10 in this embodiment (the first embodiment), the thickness on-axis d of each lens or a distance on-axis d between lenses, and a refractive index nd and an Abbe number vd of each lens. It should be noted that, in this embodiment, the curvature radius and the thickness on-axis are measured in millimeters (mm).

TABLE 1

|     | r       | d        |     | nd     |     | vd    |
|-----|---------|----------|-----|--------|-----|-------|
| St  | ∞       | d0 = −0.497 |     |        |     |       |
| R1  | 1.505   | d1 = 0.785 | nd1 | 1.5286 | v1  | 76.98 |
| R2  | 4.949   | d2 = 0.090 |     |        |     |       |
| R3  | 4.373   | d3 = 0.229 | nd2 | 1.6614 | v2  | 20.41 |
| R4  | 3.205   | d4 = 0.304 |     |        |     |       |
| R5  | −52.054 | d5 = 0.427 | nd3 | 1.5445 | v3  | 55.99 |
| R6  | −73.144 | d6 = 0.112 |     |        |     |       |
| R7  | 241.292 | d7 = 0.293 | nd4 | 1.6150 | v4  | 25.92 |
| R8  | 9.737   | d8 = 0.191 |     |        |     |       |
| R9  | 4.957   | d9 = 0.748 | nd5 | 1.5445 | v5  | 55.99 |
| R10 | −1.487  | d10 = 0.168 |     |        |     |       |
| R11 | −5.498  | d11 = 0.345 | nd6 | 1.5352 | v6  | 56.09 |
| R12 | 1.250   | d12 = 0.562 |     |        |     |       |
| R13 | ∞       | d13 = 0.110 | ndg | 1.5168 | $v_g$ | 64.17 |
| R14 | ∞       | d14 = 0.284 |     |        |     |       |

Meanings of the symbols in the table above are as follows.
r: the curvature radius of an optical surface;
St: the aperture;
R1: the object-side surface of the first lens L1;
R2: the image-side surface of the first lens L1;
R3: the object-side surface of the second lens L2;
R4: the image-side surface of the second lens L2;
R5: the object-side surface of the third lens L3;
R6: the image-side surface of the third lens L3;
R7: the object-side surface of the fourth lens L4;
R8: the image-side surface of the fourth lens L4;
R9: the object-side surface of the fifth lens L5;
R10: the image-side surface of the fifth lens L5;
R11: the object-side surface of the sixth lens L6;
R12: the image-side surface of the sixth lens L6;
R13: the object-side surface of the glass plate GF;
R14: the image-side surface of the glass plate GF;
d: the thickness on-axis of the lenses or the distance on-axis between neighboring lenses;
d0: the distance on-axis from the aperture St to the object-side surface of the first lens L1;
d1: the thickness on-axis of the first lens L1;
d2: the distance on-axis from the image-side surface of the first lens L1 to the object-side surface of the second lens L2;
d3: the thickness on-axis of the second lens L2;
d4: the distance on-axis from the image-side surface of the second lens L2 to the object-side surface of the third lens L3;
d5: the thickness on-axis of the third lens L3;
d6: the distance on-axis from the image-side surface of the third lens L3 to the object-side surface of the fourth lens L4;
d7: the thickness on-axis of the fourth lens L4;

d8: the distance on-axis from the image-side surface of the fourth lens L4 to the object-side surface of the fifth lens L5;

d9: the thickness on-axis of the fifth lens L5;

d10: the distance on-axis from the image-side surface of the fifth lens L5 to the object-side surface of the sixth lens L6;

d11: the thickness on-axis of the sixth lens L6;

d12: the distance on-axis from the image-side surface of the sixth lens L6 to the object-side surface of the optical filter GF;

d13: the thickness on-axis of the glass plate GF;

d14: the distance on-axis from the image-side surface of the glass plate GF to the image surface Si;

nd: the refractive index of the d line;

nd1: the refractive index of the first lens L1;

nd2: the refractive index of the second lens L2;

nd3: the refractive index of the third lens L3;

nd4: the refractive index of the fourth lens L4;

nd5: the refractive index of the fifth lens L5;

nd6: the refractive index of the sixth lens L6;

ndg: the refractive index of the glass plate GF;

vd: the Abbe number;

v1: the Abbe number of the first lens L1;

v2: the Abbe number of the second lens L2;

v3: the Abbe number of the third lens L3;

v4: the Abbe number of the fourth lens L4;

v5: the Abbe number of the fifth lens L5;

v6: the Abbe number of the sixth lens L6; and vg: the Abbe number of the glass plate GF.

Table 2 illustrates aspheric data of lenses of the imaging optical lens 10 in the first embodiment of the present disclosure.

Figure 3:
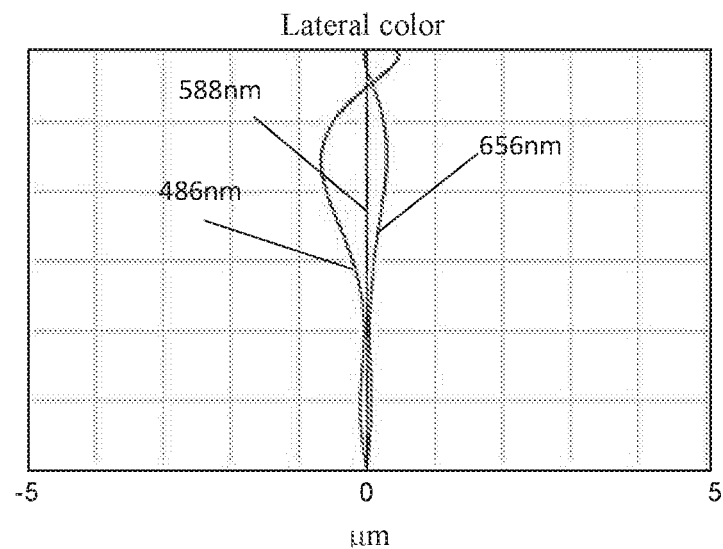
FIG. 3 is a schematic diagram of a lateral color of the imaging optical lens shown in FIG. 1.
Figure 4:
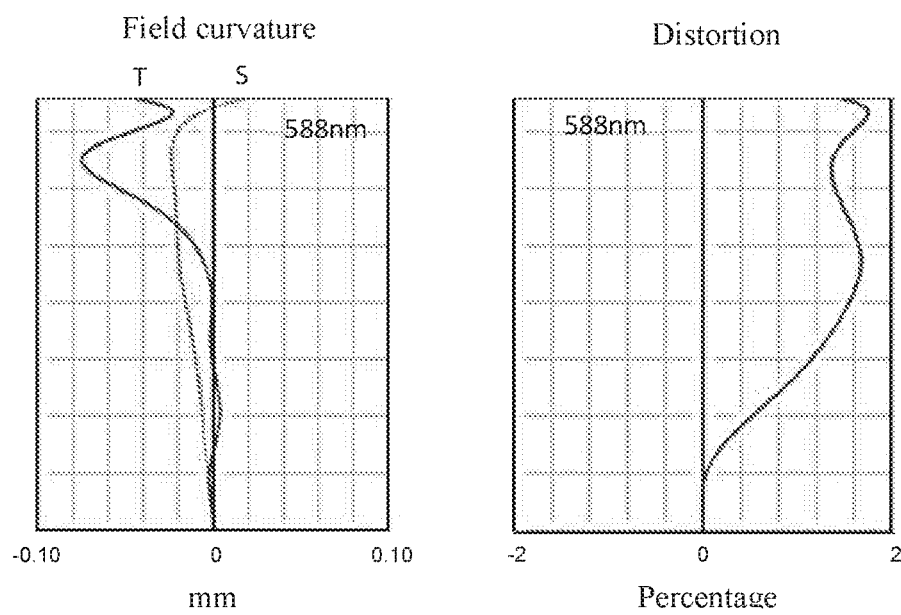
FIG. 4 is a schematic diagram of a field curvature and a distortion of the imaging optical lens shown in FIG. 1.

FIG. 3 are respectively schematic diagrams of a longitudinal aberration and a lateral color obtained when light having wavelengths of 486 nm, 588 nm and 656 nm passes through the imaging optical lens 10 in the first embodiment. FIG. 4 illustrates a schematic diagram of a field curvature and a distortion obtained when light having a wavelength of 588 nm passes through the imaging optical lens 10 in the first embodiment. In FIG. 4, S is a field curvature in a sagittal direction, and T is a field curvature in a meridian direction.

In this embodiment, a full angle of view of the imaging optical lens 10 is $2\omega$, and an F value is Fno, where $2\omega=73.06°$ and Fno=1.732. In this way, the imaging optical lens 10 has a wide angle and high light flux, and excellent optical properties.

Embodiment 2

Figure 5:
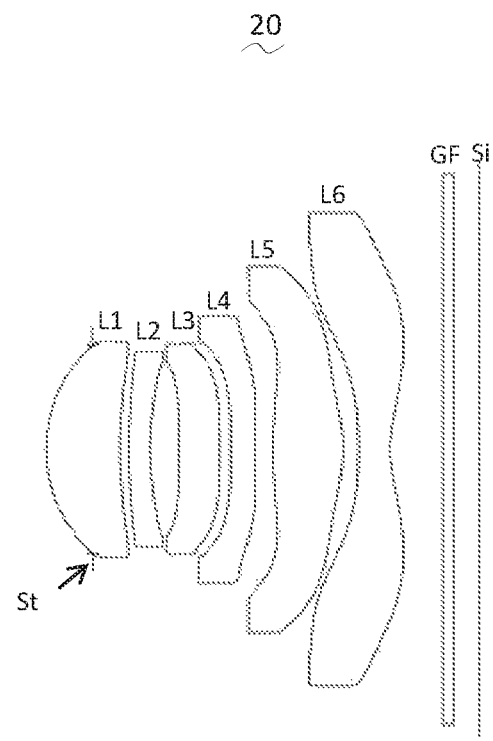
FIG. 5 is a schematic structural diagram of an imaging optical lens according to a second embodiment of the present disclosure.

FIG. 5 is a schematic structural diagram of an imaging optical lens 20 in the second embodiment. The second embodiment is substantially the same as the first embodiment, and symbols in the second embodiment have the same meanings as those in the first embodiment. Only differences between the second embodiment and the first embodiment are listed below.

Table 3 illustrates curvature radii r of the object-side surface and the image-side surface of the first lens L1 to the sixth lens L6 that constitute the imaging optical lens 20 in the second embodiment, a thickness on-axis d of each lens or a distance on-axis d between lenses, and a refractive index nd and an Abbe number vd of each lens. Table 4 illustrates aspheric data of the lenses of the imaging optical lens 20 in the second embodiment.

TABLE 2

| | Conic coefficient | Aspheric coefficient | | | | | | |
|---|---|---|---|---|---|---|---|---|
| | k | A4 | A6 | A8 | A10 | A12 | A14 | A16 |
| R1 | −2.46E−01 | −2.72E−03 | 9.44E−02 | −2.65E−01 | 4.62E−01 | −4.49E−01 | 2.31E−01 | −4.84E−02 |
| R2 | 1.50E+01 | −4.17E−02 | −9.72E−02 | 3.84E−01 | −6.71E−01 | 6.28E−01 | −3.03E−01 | 5.43E−02 |
| R3 | 9.27E+00 | −1.32E−01 | 5.96E−02 | 9.77E−02 | −2.41E−01 | 2.73E−01 | −1.63E−01 | 3.86E−02 |
| R4 | 9.10E+00 | −1.31E−01 | 1.47E−01 | −4.40E−01 | 1.18E+00 | −1.85E+00 | 1.48E+00 | −4.80E−01 |
| R5 | 1.77E+02 | −1.35E−01 | 1.56E−01 | −7.67E−01 | 1.65E+00 | −2.05E+00 | 1.30E+00 | −3.10E−01 |
| R6 | −5.00E+02 | −1.63E−01 | −1.28E−01 | 9.53E−01 | −2.79E+00 | 3.82E+00 | −2.55E+00 | 6.73E−01 |
| R7 | −4.98E+02 | −2.39E−01 | −4.92E−03 | 7.03E−01 | −1.79E+00 | 2.02E+00 | −1.10E+00 | 2.26E−01 |
| R8 | 2.22E+00 | −2.55E−01 | 1.63E−01 | −8.35E−02 | 2.99E−02 | 1.25E−02 | −1.37E−02 | 2.87E−03 |
| R9 | −3.26E+01 | 1.55E−02 | −8.62E−02 | 5.38E−02 | −3.28E−02 | 1.16E−02 | −1.89E−03 | 1.35E−04 |
| R10 | −9.28E+00 | 9.80E−02 | −4.16E−02 | −6.15E−03 | 6.34E−03 | −1.41E−03 | 1.15E−04 | −1.97E−06 |
| R11 | −8.48E−01 | −1.51E−01 | 8.76E−02 | −2.60E−02 | 6.50E−03 | −1.39E−03 | 1.87E−04 | −1.10E−05 |
| R12 | −9.80E+00 | −1.23E−01 | 6.77E−02 | −2.80E−02 | 7.29E−03 | −1.14E−03 | 1.02E−04 | −4.04E−06 |

In table 2, K is a conic coefficient, and A4, A6, A8, A10, A12, A14, and A16 are aspheric coefficients.

It should be noted that, preferably, aspheric surfaces shown in the following relational expression (6) are used as aspheric surfaces of the lenses in this embodiment. However, aspheric surfaces shown in the following relational expression (6) is only an example, and in practice, the present disclosure is not limited to the aspheric surfaces shown in the relational expression (6).

$$Y=(x^2/R)/\{1+[1-(1+k)(x^2/R^2)]^{1/2}\}\pm A_4 x^4+A_6 x^6+A_8 x^8+A_{10}x^{10}+A_{12}x^{12}+A_{14}x^{14}+A_{16}x^{16} \quad (6)$$

Figure 2:
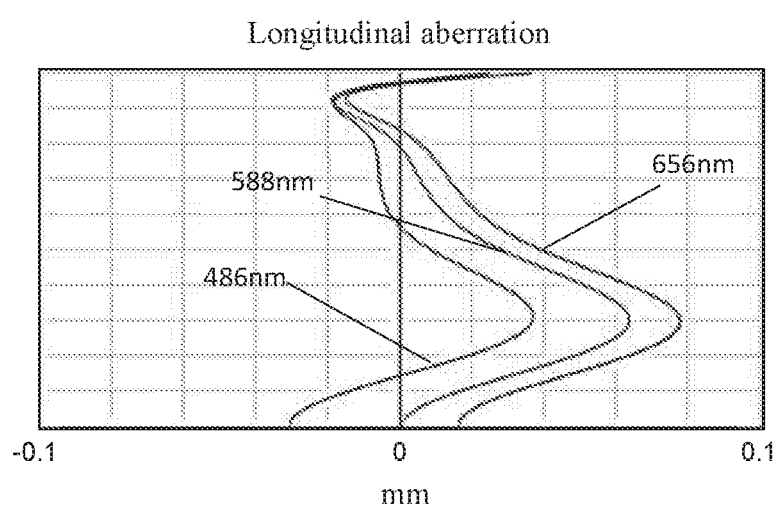
FIG. 2 is a schematic diagram of a longitudinal aberration of the imaging optical lens shown in FIG. 1.

In addition, Table 7 below further shows values of f, f1, f2, f3, f4, f5, and f6 in the first embodiment, and f and f3, v1 and v2, d1 and f, d5 and f, and R1 and R2 respectively satisfy relational expressions listed in Table 7. FIG. 2 and It should be noted that, in this embodiment, the curvature radius and the thickness on-axis are measured in millimeters (mm).

TABLE 3

| | r | d | | nd | | vd |
|---|---|---|---|---|---|---|
| St | ∞ | d0 = | −0.503 | | | |
| R1 | 1.503 | d1 = | 0.792 | nd1 | 1.5285 | v1 | 95.27 |
| R2 | 4.942 | d2 = | 0.093 | | | |
| R3 | 4.367 | d3 = | 0.230 | nd2 | 1.6614 | v2 | 20.41 |
| R4 | 3.204 | d4 = | 0.308 | | | |
| R5 | −53.442 | d5 = | 0.433 | nd3 | 1.5445 | v3 | 55.99 |
| R6 | −56.772 | d6 = | 0.118 | | | |
| R7 | 133.154 | d7 = | 0.266 | nd4 | 1.6150 | v4 | 25.92 |
| R8 | 8.996 | d8 = | 0.191 | | | |

TABLE 3-continued

| | r | d | | nd | | vd |
|---|---|---|---|---|---|---|
| R9 | 4.988 | d9 = | 0.748 | nd5 | 1.5445 | v5 | 55.99 |
| R10 | −1.494 | d10 = | 0.165 | | | |
| R11 | −5.488 | d11 = | 0.336 | nd6 | 1.5352 | v6 | 56.09 |
| R12 | 1.255 | d12 = | 0.567 | | | |
| R13 | ∞ | d13 = | 0.110 | ndg | 1.5168 | $v_g$ | 64.17 |
| R14 | ∞ | d14 = | 0.284 | | | |

TABLE 4

| | Conic coefficient | Aspheric coefficient | | | | | | |
|---|---|---|---|---|---|---|---|---|
| | k | A4 | A6 | A8 | A10 | A12 | A14 | A16 |
| R1 | −2.50E−01 | −3.00E−03 | 9.42E−02 | −2.65E−01 | 4.62E−01 | −4.49E−01 | 2.31E−01 | −4.84E−02 |
| R2 | 1.51E+01 | −4.15E−02 | −9.71E−02 | 3.84E−01 | −6.72E−01 | 6.28E−01 | −3.03E−01 | 5.45E−02 |
| R3 | 9.29E+00 | −1.32E−01 | 5.96E−02 | 9.78E−02 | −2.41E−01 | 2.74E−01 | −1.63E−01 | 3.86E−02 |
| R4 | 9.11E+00 | −1.32E−01 | 1.47E−01 | −4.40E−01 | 1.18E+00 | −1.85E+00 | 1.48E+00 | −4.81E−01 |
| R5 | 3.73E+02 | −1.36E−01 | 1.56E−01 | −7.67E−01 | 1.65E+00 | −2.05E+00 | 1.30E+00 | −3.11E−01 |
| R6 | −5.00E+02 | −1.63E−01 | −1.28E−01 | 9.53E−01 | −2.79E+00 | 3.82E+00 | −2.55E+00 | 6.73E−01 |
| R7 | −5.00E+02 | −2.41E−01 | −5.93E−03 | 7.02E−01 | −1.79E+00 | 2.02E+00 | −1.10E+00 | 2.26E−01 |
| R8 | 7.52E+00 | −2.54E−01 | 1.63E−01 | −8.36E−01 | 2.98E−01 | 1.24E−02 | −1.37E−02 | 2.88E−03 |
| R9 | −2.76E+01 | 1.76E−02 | −8.58E−02 | 5.39E−02 | −3.28E−02 | 1.17E−02 | −1.88E−03 | 1.36E−04 |
| R10 | −9.44E+00 | 9.82E−02 | −4.16E−02 | −6.17E−03 | 6.33E−03 | −1.41E−03 | 1.15E−04 | −1.77E−06 |
| R11 | −8.49E−01 | −1.51E−01 | 8.76E−02 | −2.60E−02 | 6.50E−03 | −1.39E−03 | 1.87E−04 | −1.10E−05 |
| R12 | −1.02E+01 | −1.23E−01 | 6.77E−02 | −2.80E−02 | 7.29E−03 | −1.14E−03 | 1.02E−04 | −4.04E−06 |

Table 7 below exemplarily shows values of f, f1, f2, f3, f4, f5, and f6 in the second embodiment, and f and f3, v1 and v2, d1 and f, d5 and f, and R1 and R2 respectively satisfy the relational expressions listed in Table 7.

Figure 6:
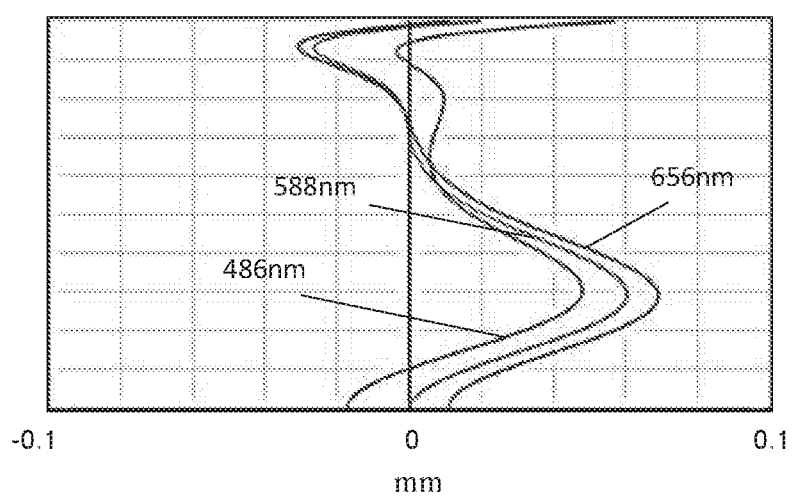
FIG. 6 is a schematic diagram of a longitudinal aberration of the imaging optical lens shown in FIG. 5.
Figure 7:
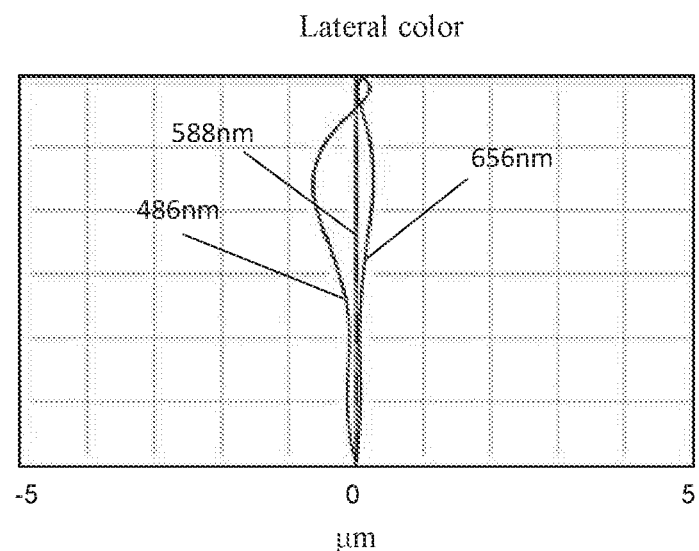
FIG. 7 is a schematic diagram of a lateral color of the imaging optical lens shown in FIG. 5.
Figure 8:
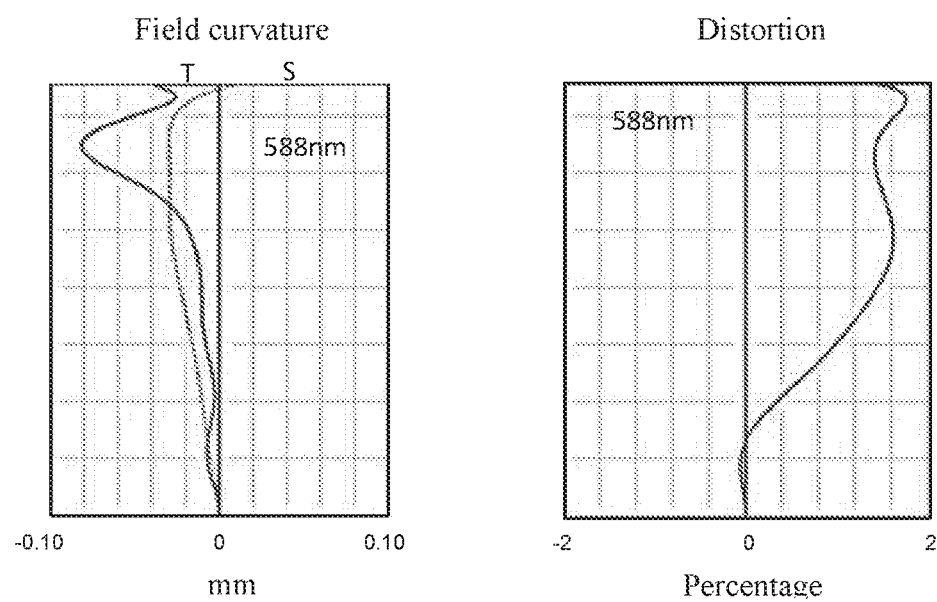
FIG. 8 is a schematic diagram of a field curvature and a distortion of the imaging optical lens shown in FIG. 5.

FIG. 6 and FIG. 7 are respectively schematic diagrams of a longitudinal aberration and a lateral color obtained when light having wavelengths of 486 nm, 588 nm and 656 nm passes through the imaging optical lens 20 in the second embodiment. FIG. 8 is a schematic diagram of a field curvature and a distortion obtained when light having a wavelength of 588 nm passes through the imaging optical lens 20 in the second embodiment.

In the imaging optical lens 20 of this embodiment, 2ω=72.77°, and Fno=1.732. In this way, the imaging optical lens 20 has a wide angle, high light flux, and excellent optical properties.

Embodiment 3

Figure 9:
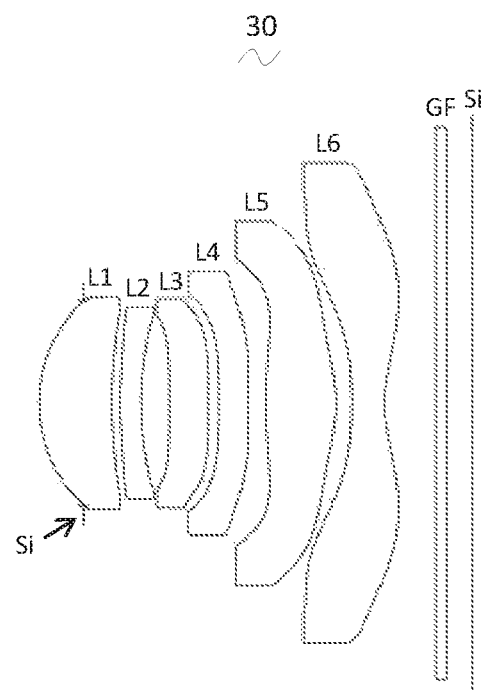
FIG. 9 is a schematic structural diagram of an imaging optical lens according to a third embodiment of the present disclosure.

FIG. 9 is a schematic structural diagram of an imaging optical lens 30 in the third embodiment. The third embodiment is substantially the same as the first embodiment, and symbols in the third embodiment have the same meanings as those in the first embodiment. Only differences between the third embodiment and the first embodiment are listed below.

Table 5 illustrates curvature radii r of the object-side surface and the image-side surface of the first lens L1 to the sixth lens L6 that constitute the imaging optical lens 30 in the third embodiment, a thickness on-axis d of each lens or a distance on-axis d between lenses, and a refractive index nd and an Abbe number vd of each lens. Table 6 illustrates aspheric data of the lenses of an imaging optical lens 30 in the third embodiment.

It should be noted that, in this embodiment, the curvature radius and the thickness on-axis are measured in millimeters (mm).

TABLE 5

| | r | d | | nd | | vd |
|---|---|---|---|---|---|---|
| St | ∞ | d0 = | −0.482 | | | |
| R1 | 1.508 | d1 = | 0.782 | nd1 | 1.5277 | v1 | 63.80 |
| R2 | 4.945 | d2 = | 0.086 | | | |
| R3 | 4.375 | d3 = | 0.227 | nd2 | 1.6614 | v2 | 20.41 |
| R4 | 3.204 | d4 = | 0.300 | | | |
| R5 | −56.031 | d5 = | 0.423 | nd3 | 1.5445 | v3 | 55.99 |
| R6 | −66.544 | d6 = | 0.106 | | | |
| R7 | 162.282 | d7 = | 0.311 | nd4 | 1.6150 | v4 | 25.92 |
| R8 | 9.932 | d8 = | 0.193 | | | |
| R9 | 4.895 | d9 = | 0.750 | nd5 | 1.5445 | v5 | 55.99 |
| R10 | −1.487 | d10 = | 0.168 | | | |
| R11 | −5.555 | d11 = | 0.349 | nd6 | 1.5352 | v6 | 56.09 |
| R12 | 1.251 | d12 = | 0.554 | | | |
| R13 | ∞ | d13 = | 0.110 | ndg | 1.5168 | $v_g$ | 64.17 |
| R14 | ∞ | d14 = | 0.284 | | | |

TABLE 6

| | Conic coefficient | Aspheric coefficient | | | | | | |
|---|---|---|---|---|---|---|---|---|
| | k | A4 | A6 | A8 | A10 | A12 | A14 | A16 |
| R1 | −2.43E−01 | −2.43E−03 | 9.45E−02 | −2.65E−01 | 4.62E−01 | −4.49E−01 | 2.31E−01 | −4.84E−02 |
| R2 | 1.50E+01 | −4.20E−02 | −9.71E−02 | 3.84E−01 | −6.72E−01 | 6.27E−01 | −3.03E−01 | 5.44E−02 |
| R3 | 9.27E+00 | −1.32E−01 | 5.96E−02 | 9.76E−02 | −2.41E−01 | 2.73E−01 | −1.63E−01 | 3.84E−02 |
| R4 | 9.12E+00 | −1.31E−01 | 1.47E−01 | −4.40E−01 | 1.18E+00 | −1.85E+00 | 1.48E+00 | −4.80E−01 |
| R5 | 4.09E+02 | −1.36E−01 | 1.55E−01 | −7.67E−01 | 1.65E+00 | −2.05E+00 | 1.30E+00 | −3.09E−01 |
| R6 | −5.00E+02 | −1.63E−01 | −1.27E−01 | 9.54E−01 | −2.79E+00 | 3.82E+00 | −2.55E+00 | 6.72E−01 |

TABLE 6-continued

| | Conic coefficient | Aspheric coefficient | | | | | | |
|---|---|---|---|---|---|---|---|---|
| | k | A4 | A6 | A8 | A10 | A12 | A14 | A16 |
| R7 | 5.00E+02 | −2.37E−01 | −3.80E−03 | 7.05E−01 | −1.78E+00 | 2.02E+00 | −1.10E+00 | 2.26E−01 |
| R8 | −5.69E+00 | −2.56E−01 | 1.62E−01 | −8.37E−02 | 2.98E−02 | 1.24E−02 | −1.37E−02 | 2.86E−03 |
| R9 | −3.51E+01 | 1.38E−02 | −8.70E−02 | 5.35E−02 | −3.29E−02 | 1.16E−02 | −1.90E−03 | 1.31E−04 |
| R10 | −9.23E+00 | 9.79E−02 | −4.16E−02 | −6.18E−03 | 6.33E−03 | −1.41E−03 | 1.15E−04 | −1.95E−06 |
| R11 | −8.73E−01 | −1.51E−01 | 8.76E−02 | −2.60E−02 | 6.50E−03 | −1.39E−03 | 1.87E−04 | −1.10E−05 |
| R12 | −9.70E+00 | −1.23E−01 | 6.77E−02 | −2.80E−02 | 7.29E−03 | −1.14E−03 | 1.02E−04 | −4.04E−06 |

Table 7 below exemplarily shows values of f, f1, f2, f3, f4, f5, and f6 in the third embodiment, and f and f3, v1 and v2, d1 and f, d5 and f, and R1 and R2 respectively satisfy the relational expressions listed in Table 7.

Figure 10:
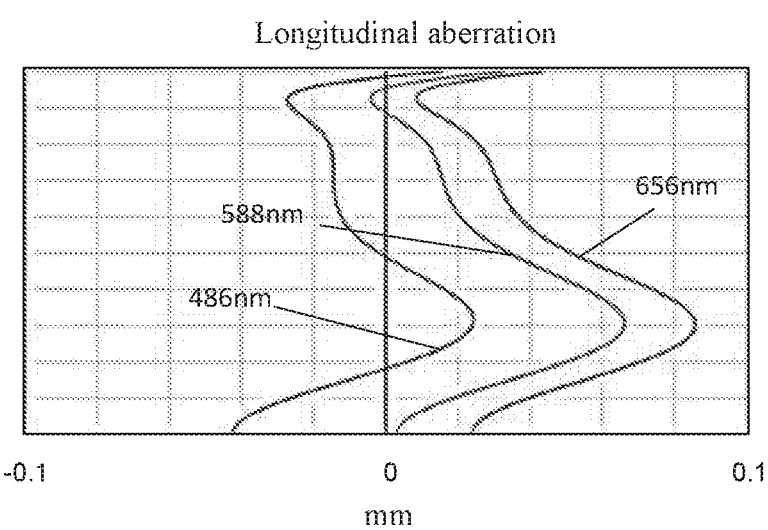
FIG. 10 is a schematic diagram of a longitudinal aberration of the imaging optical lens shown in FIG. 9.
Figure 11:
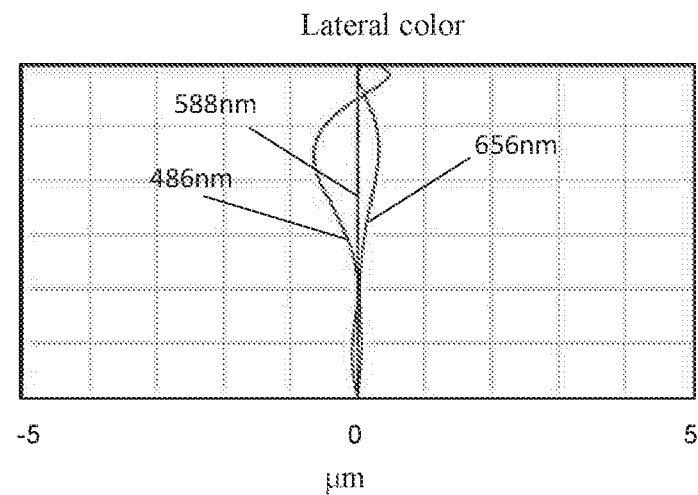
FIG. 11 is a schematic diagram of a lateral color of the imaging optical lens shown in FIG. 9.
Figure 12:
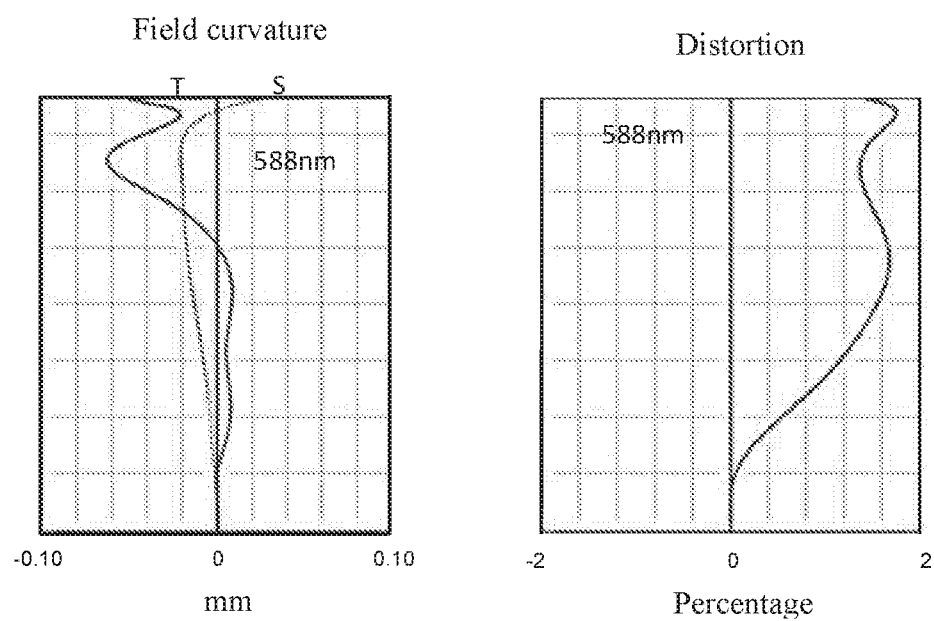
FIG. 12 is a schematic diagram of a field curvature and a distortion of the imaging optical lens shown in FIG. 9.

FIG. 10 and FIG. 11 are respectively schematic diagrams of a longitudinal aberration and a lateral color obtained when light having wavelengths of 486 nm, 588 nm and 656 nm passes through the imaging optical lens 30 in the third embodiment. FIG. 12 is a schematic diagram of a field curvature and a distortion obtained when light having a wavelength of 588 nm passes through the imaging optical lens 30 in the third embodiment.

In the imaging optical lens 30 of this embodiment, $2\omega=73.62°$, and Fno=1.75. In this way, the imaging optical lens 30 has a wide angle, high light flux, and excellent optical properties.

Table 7 below illustrates values corresponding to expressions (1), (2), (3), (4), and (5) and values of other related parameters in the first embodiment, the second embodiment, and the third embodiment based on the above expressions.

TABLE 7

| | Embodiment 1 | Embodiment 2 | Embodiment 3 | Note |
|---|---|---|---|---|
| f3/f | −86.302 | −450.572 | −172.601 | Relational expression (1) |
| v1/v2 | 3.771 | 4.668 | 3.125 | Relational expression (2) |
| d1/f | 0.204 | 0.204 | 0.205 | Relational expression (3) |
| d5/f | 0.111 | 0.112 | 0.111 | Relational expression (4) |
| (R1 + R2)/(R1 − R2) | −1.874 | −1.875 | −1.877 | Relational expression (5) |
| Fno | 1.732 | 1.732 | 1.746 | |
| 2w | 73.059 | 72.773 | 73.619 | |
| f | 3.853 | 3.876 | 3.812 | |
| f1 | 3.781 | 3.777 | 3.796 | |
| f2 | −19.462 | −19.542 | −19.392 | |
| f3 | −332.539 | −1746.339 | −657.955 | |
| f4 | −16.356 | −15.558 | −17.060 | |
| f5 | 2.181 | 2.192 | 2.176 | |
| f6 | −1.861 | −1.867 | −1.866 | |

Those of ordinary skill in the art may understand that the foregoing embodiments are specific examples for implementing the present disclosure, and in a practical application, various variations may be made to the form and details without departing from the spirit and scope of the present disclosure.

What is claimed is:

1. An imaging optical lens, comprising from an object side to an image side in sequence: a first lens having a positive refractive power, a second lens having a negative refractive power, a third lens having a negative refractive power, a fourth lens having a negative refractive power, a fifth lens having a positive refractive power, and a sixth lens having a negative refractive power, wherein a focal length of the imaging optical lens is f, a focal length of the third lens is f3, a thickness on-axis of the first lens is d1, an Abbe number of the first lens is v1, an Abbe number of the second lens is v2, and the following relational expressions are satisfied:

$-500 \leq f3/f \leq -50;$ $0.20 \leq d1/f \leq 0.50;$ and $2.7 \leq v1/v2 \leq 5.0.$ 2. The imaging optical lens according to claim 1, wherein a thickness on-axis of the third lens is d5, and the following relational expression is satisfied:

$0.11 \leq d5/f \leq 0.2.$

3. The imaging optical lens according to claim 1, wherein a curvature radius of an object-side surface of the first lens is R1, a curvature radius of an image-side surface of the first lens is R2, and the following relational expression is satisfied:

$-1.90 \leq (R1+R2)/(R1-R2) \leq -1.7.$

4. An imaging optical lens, comprising from an object side to an image side in sequence: a first lens having a positive refractive power, a second lens having a negative refractive power, a third lens having a negative refractive power, a fourth lens having a negative refractive power, a fifth lens having a positive refractive power, and a sixth lens having a negative refractive power, wherein a focal length of the imaging optical lens is f, a focal length of the third lens is f3, a curvature radius of an object-side surface of the first lens is R1, a curvature radius of an image-side surface of the first lens is R2, an Abbe number of the first lens is v1, an Abbe number of the second lens is v2, and the following relational expressions are satisfied:

$-500 \leq f3/f \leq -50;$ $-1.90 \leq (R1+R2)/(R1-R2) \leq -1.7;$ and $2.7 \leq v1/v2 \leq 5.0.$ 5. The imaging optical lens according to claim 4, wherein a thickness on-axis of the third lens is d5, and the following relational expression is satisfied:

$0.11 \leq d5/f \leq 0.2.$

* * * * *